W. KENYON,
Assignor to G. B. MAYNADIER.
Photographic Head Rest.
No. 9,451. Reissued Nov. 9, 1880.
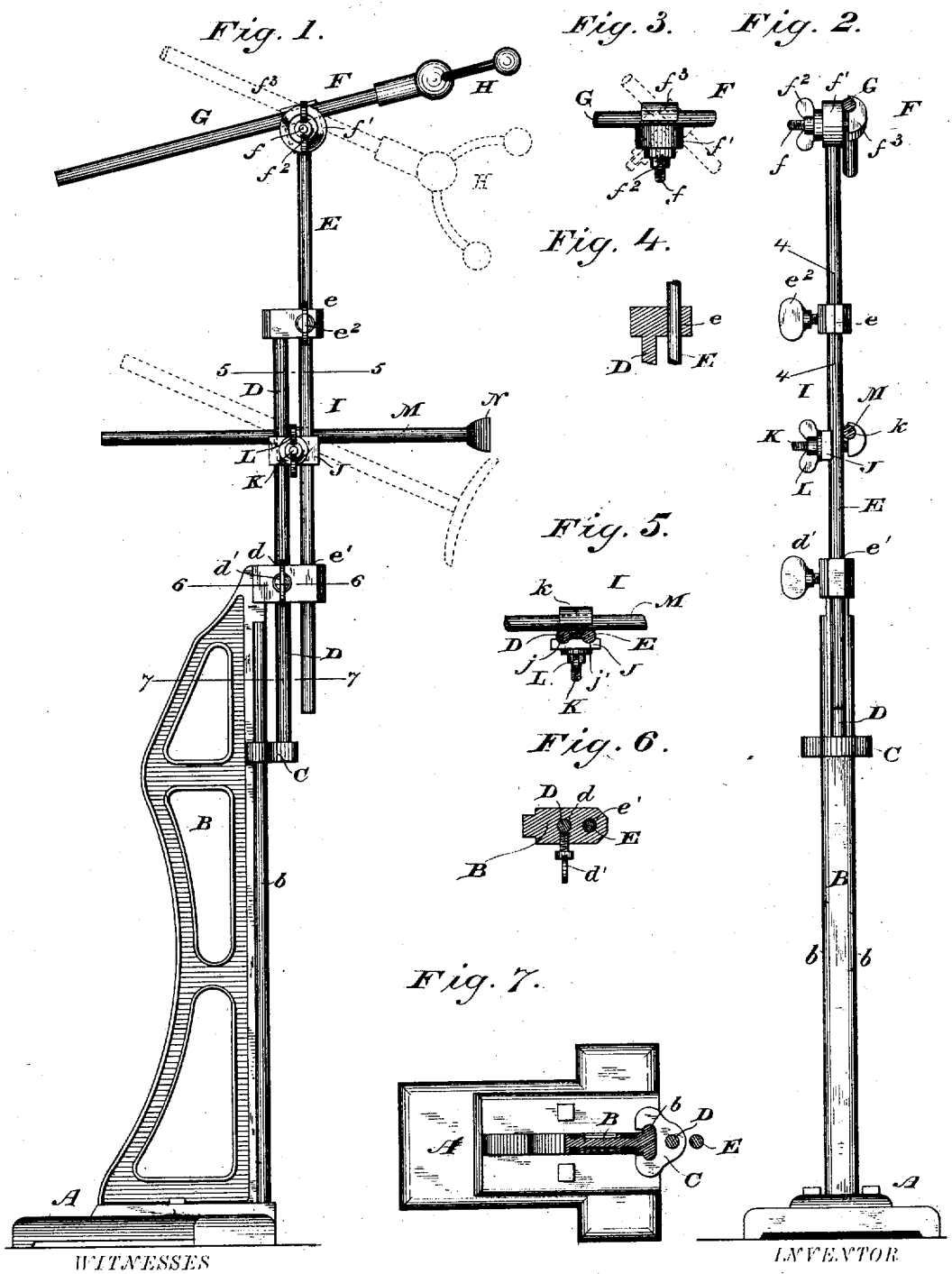
WITNESSES
Wm. A. Skinkle.
Wm. T. Kilgrove
INVENTOR
Wiley Kenyon.
By his Attorneys
Baldwin, Hopkins & Peyton
N. PETERS, PHOTO-LITHOGRAPHER, WASHINGTON, D. C.

UNITED STATES PATENT OFFICE.

WILEY KENYON, OF CRAWFORDSVILLE, INDIANA, ASSIGNOR TO GUSTAVUS B. MAYNADIER.

PHOTOGRAPHIC HEAD-REST.

SPECIFICATION forming part of Reissued Letters Patent No. 9,451, dated November 9, 1880.

Original No. 94,754, dated September 14, 1869. Application for reissue filed November 26, 1879.

*To all whom it may concern:*

Be it known that I, WILEY KENYON, of Crawfordsville, in the county of Montgomery and State of Indiana, have invented a new and Improved Head-Rest, as well as a new and Improved Back-Rest; and I do hereby declare that the following is a full, clear, and exact description thereof, which will enable others skilled in the art to make and use the same, reference being had to the accompanying drawings, in which—

Figure 1 is a side view of a photographic head-rest and posing apparatus embodying my improvements in the best way known to me at the date of filing my application for the original patent. Fig. 2 is a front view thereof, partly in section. Fig. 3 is a plan or top view of the clamp-connection between the head-rest bar and head-rest carrier. Fig. 4 is a section on the line 4 4 of Fig. 2. Fig. 5 is a section on the line 5 5 of Fig. 1, showing a plan or top view of the clamp-connection between the back-rest carrier and its supports; and Figs. 6 and 7 are sectional views on the lines 6 6 and 7 7, respectively, of Fig. 1.

The objects of my invention are to give to head-rests and back-rests a wide range of movement in various directions and enable them to be securely clamped in the desired positions, this wide range of adjustment being desirable in order to accommodate persons of different sizes and insure their ease and comfort, while enabling the operator to place the person in the desired position with ease and rapidity to facilitate his work and produce the best results.

My invention consists of certain new combinations and organizations of devices recited at the end of this specification.

The base A and standard or upright frame B of the photographic head-rest and posing apparatus illustrated in the accompanying drawings are of well-known construction, except that the front edge of the standard or frame is provided with a flange, *b*, to which is fitted a slide, C, mounted upon the lower end of a vertically-adjustable support or rod, D, movable endwise through a bearing or socket, *d*, formed at the upper end of said standard or frame B. A set or clamp screw, $d'$, works through the wall of said socket or bearing *d*, and affords means for securely fastening the support or rod D at any point of elevation or altitude desired relatively to the standard or frame B.

At the upper end of the support or rod D is mounted a socket plate or bearing, *e*, through which a cylindrical head-rest bar, E, slides vertically, the lower end of said bar being also guided and fitted in a similar socket or bearing, $e'$, formed in the upper end of the standard B in front of the bearing *d*, through which the support or rod D slides. The head-rest bar E is locked in its vertically-adjusted position by a set or clamp screw, $e^2$, which works through the wall of the socket-bearing *e* at the upper end of the support or rod D in a well-known way.

The rod or support D and head-rest bar E are thus arranged parallel to each other, and upon the upper end of said head-rest bar E (which has the capacity of turning or swiveling axially in its bearings, as well as of moving endwise therein independently of the support or rod D, when the clamp $e^2$ is loosened) is mounted a clamp joint or connection, F, consisting, in the example shown, of a bolt, *f*, passing through a bearing or socket, $f'$, formed in the said bar E at right angles to the longitudinal axis of the bar, the said bolt being screw-threaded at one end and provided with a clamp-nut, $f^2$, to tighten the bolt, which at its opposite end is provided with a hook or bearing, $f^3$, for the reception of a cylindrical carrier, G, carrying at one end a head-rest, H. This head-rest carrier G has the capacity, first, of sliding endwise in the clamp-joint to carry the head-rest backward or forward; secondly, of turning axially to vary the position of the head-rest sidewise or angularly; and, thirdly, of being rocked vertically by the turning or swiveling of the clamp-bolt *f* in its bearing in the head-rest bar to carry the head-rest up or down. (See the dotted lines in Fig. 1.)

The carrier G, while possessing the capacities of movement mentioned, has also the capacity of being firmly clamped in the position to which it may have been adjusted by the single clamp or set nut $f^2$, which, when tightened, draws the bolt endwise and clamps the carrier between its hooked end $f^3$ and the bearing $f'$, thus stiffening the whole joint or connection and securely locking the head-rest to its supporting-bar E in the position desired.

Intermediate of the head-rest and the standard or supporting-frame B is mounted a clamp joint or connection, I, capable of sliding or of being adjusted up and down or endwise upon the rod or support D and head-rest bar E, the clamp-joint consisting, in the example shown, of a yoke, J, having grooves or bearings *j j* to fit the support or rod D and bar E, a hooked bolt, K, similar to the bolt *f* of the head-rest clamp-joint, and a set or clamp nut, L, which works upon the screw-threaded end of said bolt.

Fitting the bearing or recess *k* formed by the hook of the clamp-bolt K is a cylindrical carrier, M, similar to the head-rest carrier, upon one end of which a back rest or support, N, is mounted, the said back-rest, by its carrier and clamp-joint connection, having the same capacities of adjustment as the head-rest above described, with the additional capacity, due to the movable clamp-joint connection, of adjustment independently up and down upon the support D and bar E.

The tightening of the clamp-nut L draws the hooked end of the bolt K toward the support or rod D and bar E and clamps the back-carrier M firmly between said hooked end of the bolt and said rod and bar, the yoke J at the same time being forced tightly against the said rod and bar, which fit its grooves, and securely clamped, thereby stiffening the whole joint or connection and locking the back-rest firmly in its adjusted position.

It will thus be perceived that I provide by my invention a head-rest and a back-rest, each possessing a wide range of adjustment; and it will also be noted that I combine the said back-rest and head-rest with a common base or supporting frame.

I do not wish to be understood as claiming to be the first to mount a head-rest upon one end of a cylindrical carrier movable endwise in a socket and capable of being secured by a clamp or set screw, nor the combination of such a head-rest with a back, as these features are very old.

I claim as my invention—

1. The combination, substantially as hereinbefore set forth, of the head-rest bar, the head-rest carrier, the head-rest mounted upon one end of said carrier, and a rocking clamp-connection between the said head-rest bar and head-rest carrier, in which said carrier may be moved endwise, whereby the head-rest may be adjusted backward and forward and be rocked vertically by the rocking of the clamp-connection in which the head-rest carrier moves relatively to the head-rest bar.

2. The combination, substantially as hereinbefore set forth, of the head-rest bar, the head-rest carrier, the head-rest connected to one end of said carrier, a clamp-joint which connects said head-rest bar and head-rest carrier and permits said carrier to be moved endwise in the joint and to be rocked by the turning of the joint relatively to said head-rest bar, and a back-rest, relatively to which the head-rest may be adjusted.

3. The combination, substantially as hereinbefore set forth, of a support and a back-rest by connections which permit said back-rest to be adjusted backward and forward, to be rocked, and to be moved vertically relatively to said support, and which enable said back-rest to be firmly clamped in its adjusted position as against all its movements.

4. The combination, substantially as hereinbefore set forth, of a support, a back-rest, a carrier with one end of which said back-rest is connected, a clamp-joint between said support and said carrier, which permits said carrier to be moved endwise or backward and forward and to be rocked by the turning of the clamp-joint relatively to said support, and a head-rest independently adjustable relatively to the back-rest.

5. The combination, substantially as hereinbefore set forth, with a common base or supporting frame, of a back-rest mounted upon one end of a carrier having the capacity of being moved backward and forward or endwise in a clamp-joint and securely locked, and a head-rest, also mounted upon one end of a carrier, having the capacity of being moved backward and forward or endwise in a clamp-joint and securely locked in the position desired.

6. The combination, substantially as hereinbefore set forth, of a support, a back-rest carrier, a clamp-connection which permits said back-rest carrier to slide up and down, and also to rock upon said support, and enables the back to be firmly clamped in the desired position.

7. The combination, substantially as hereinbefore set forth, of a support, a back-rest, connections between said support and back-rest which permit the backward and forward adjustment of said back-rest and enable it to rock vertically, and a head-rest capable of adjustment relatively to said back-rest.

8. The combination, substantially as hereinbefore set forth, of a base, a support adjustable up and down relatively to said base, a back-rest connected with said support by connections which permit said back-rest to be moved backward and forward and to be rocked, and a head-rest, also carried by said support, capable of adjustment independently of the adjustment of the back-rest.

Witnesses: WILEY KENYON.
SAML. S. THOMSON,
W. T. BRUSH.